US012667111B2

(12) United States Patent　　　　(10) Patent No.:　US 12,667,111 B2

Lorenzo Noguera　　　　　　　　　　(45) Date of Patent:　Jun. 30, 2026

(54) CLOSING MACHINE FOR CLOSING SAUSAGE PRODUCTS

(71) Applicant: Sagar Lorenzo Noguera, Mataro (ES)

(72) Inventor: Sagar Lorenzo Noguera, Mataro (ES)

( * ) Notice: Subject to any disclaimer, the term of this patent is extended or adjusted under 35 U.S.C. 154(b) by 0 days.

(21) Appl. No.: 18/985,552

(22) Filed: Dec. 18, 2024

(65) Prior Publication Data

US 2025/0204539 A1　　Jun. 26, 2025

(30) Foreign Application Priority Data

Dec. 20, 2023　(EP) ..................................... 23383339

(51) Int. Cl.
　　*A22C 11/02*　　　　(2006.01)
　　*A22C 11/12*　　　　(2006.01)
(52) U.S. Cl.
　　CPC .................................. *A22C 11/125* (2013.01)
(58) Field of Classification Search
　　CPC ....... A22C 11/125; B65B 51/07; B65B 25/06;
　　　　　　Y10T 29/53783; H04N 9/3105; B65G
　　　　　　　　　　　　　　　　　　　　　1/04
　　USPC ...... 452/48; 53/138.2; 242/563.2; 198/678.1
　　See application file for complete search history.

(56) References Cited

U.S. PATENT DOCUMENTS 6,217,436 B1　4/2001　Hanten et al.
7,520,106 B2 *　4/2009　Topfer ..................... B65B 51/04
　　　　　　　　　　　　　　　　　　　　53/138.4

2006/0254211 A1　11/2006　Topfer
2007/0012813 A1　1/2007　Topfer
2008/0085668 A1 *　4/2008　Ebert ................... A22C 11/125
　　　　　　　　　　　　　　　　　　　　452/46
2008/0223694 A1　9/2008　Ebert et al.
2021/0267222 A1　9/2021　Zurwieden

FOREIGN PATENT DOCUMENTS

EA　　　201650063 A1　4/2018
EP　　　　0935421 B1　6/2001
EP　　　　1969946 A1　9/2008
EP　　　　3871506 A2　9/2021
RU　　　　2759607 C1　11/2021
WO　　1998018334 A1　5/1998

* cited by examiner

*Primary Examiner* — Richard T Price, Jr.

(74) *Attorney, Agent, or Firm* — Lerner David LLP

(57)　　　　　　　ABSTRACT

A closing machine for closing sausage products that has a gripper mechanism, a separator mechanism and a stapler mechanism, where at least the stapler mechanism can be driven independently but in coordination with the gripper and separator mechanisms during a cycle of the machine when operating in production mode (P1 to P4) in which the gripper, separator and stapler mechanisms each adopt the same position at the beginning and at the end of the cycle. The machine further comprises a staple supply mechanism for supplying staples to the stapler mechanism that is a staple supply mechanism that can be driven independently of the gripper, separator and stapler mechanisms.

17 Claims, 7 Drawing Sheets

Fig. 7a                       Fig. 7b

CLOSING MACHINE FOR CLOSING SAUSAGE PRODUCTS

CROSS-REFERENCE TO RELATED APPLICATION

This application claims priority to European Patent Application No. 23383339.1 filed on Dec. 20, 2023, the disclosure of which is hereby incorporated by reference.

TECHNICAL FIELD OF THE INVENTION

The invention relates to a closing machine for closing sausage products with a stapler mechanism and a staple supply mechanism that can both be driven in coordination during a cycle of the machine when operating in production mode, wherein the machine is capable of ensuring closure by crimping at least one staple around an empty sausage product portion.

BACKGROUND OF THE INVENTION

Patent document EP 0935421 discloses a closing machine for closing sausage products with a stapler mechanism, a gripper mechanism and a separator mechanism that can be driven in coordination during a cycle of the machine when operating in production mode.

The stapler mechanism is of the type that has an upper jaw and a lower jaw that can be driven from a position of maximum distance to a position of maximum closeness and once again to the position of maximum distance in a cycle of the machine when operating in production mode. Between said upper and lower jaws, in each cycle, a filled sausage product in course of production is provided and placed.

The gripper mechanism has two pairs of heads, where the heads of each pair can be driven in a direction transverse to the orientation of the sausage product from a position of maximum distance to a position of maximum closeness and once again to the position of maximum distance in a cycle of the machine when operating in production mode. The heads of the same pair are configured so that in the position of maximum closeness they constrict the sausage product placed between them.

The separator mechanism can be driven to move each pair of heads of the gripper mechanism in a longitudinal direction with respect to the sausage product and from a position of maximum closeness to a position of maximum distance in order to produce an empty product portion in the filled sausage product, the heads adopting the position of maximum closeness.

The stapler mechanism has an associated staple supply mechanism for placing two staples between the upper and lower jaws of the stapler mechanism so that they close by crimping around the empty product portion and one staple seals an end of a sausage product unit and the other staple seals the beginning of another sausage product unit. All of this is carried out in such a way that when cutting the empty sausage product between the two staples recently closed around the aforementioned empty sausage product portion, a finished sausage product unit is separated from a unit that follows it on the production line and the beginning of which will have already been sealed.

Document EP 0935421 proposes that the stapler mechanism, the gripper mechanism and the separator mechanism each have an electric motor so that they can be driven and for said drive to be electronically coordinated. Accordingly, the machine can be operated in a production mode such that, in a cycle of the machine, the times during which the stapler mechanism, the gripper mechanism and the separator mechanism are driven overlap as desired.

In theory, this overlap can lead to increased productivity, that is, it can lead to a shorter cycle of the machine when operating in production mode. Practice has shown, however, that there are limits that interfere or prevent the cycle of the machine from being shortened as much as expected in production mode. For example, there is an increase in the number of incidents that force the machine to stop.

A first purpose of the present invention is a machine set up to increase the productivity of known machines.

Not reducing the number of stapling operations per unit of time, but ensuring fewer incidents is considered an increase in productivity.

Better use of the staples stored in a staple magazine, for example, wrapped around a core or reel from where they are stretched on demand by the machine, is considered an increase in productivity.

Reducing the time required to replace a staple magazine with a new one and/or facilitate this replacement operation and/or offer greater safety to the operator (and allocate fewer resources to it) is considered an increase in productivity.

A reduction in the number of incidents is considered an increase in productivity.

Patent document EP 1969946 discloses a closing machine for closing sausage products, the lower jaw of which has a press die and a staple supply mechanism to place a staple between the upper and lower jaws of the stapler mechanism and specifically on the press die in each cycle of the machine when operating in production mode.

Document EP 1969946 envisages that the staple supply mechanism comprises an eccentric as a drive element of a gear element configured to engage with a train of staples and ensure a step of the train of staples in a feed direction that places a staple of the train of staples on the press die to be crimped when the upper jaw and the lower jaw are driven from their position of maximum distance to their position of maximum closeness.

A rotary movement can be imparted to the eccentric, for example, by means of a belt or chain drive, which is in turn driven by a main shaft of the machine that also drives the stapler mechanism. Document EP 1969946 also indicates the possibility that the drive of the eccentric is moved by a hydraulic or pneumatic cylinder.

SUMMARY OF THE INVENTION

A drive of the gripper, separator and stapler mechanisms that comprises, in each cycle of the machine when operating in production mode overlapping as desired, the times during which said gripper, separator and stapler mechanisms are driven will undoubtedly reduce the cycle time.

This reduction in cycle time is satisfying.

Despite this, the inventors of the present invention have discovered unidentified problems.

To solve these problems, a machine like the one described in claim 1 is proposed.

As is known, said machine has a gripper mechanism, a separator mechanism and a stapler mechanism where at least the stapler mechanism can be driven independently but in coordination with the gripper and separator mechanisms during a cycle of the machine when operating in production mode in which said gripper, separator and stapler mechanisms each adopt the same position at the beginning and at the end of said cycle.

The machine of claim 1 is characterised in that it comprises a staple supply mechanism for supplying staples to the stapler mechanism that is a staple supply mechanism that can be driven independently of the gripper, separator and stapler mechanisms.

As will be explained later, this enables the machine to drive the staple supply mechanism to produce several effects in favour of increasing productivity by means other than those that involve shortening the execution time of a cycle of the machine when operating in production mode.

In one embodiment, the stapler mechanism comprises a first jaw that has a press head and a second jaw that has a press die, the first and second jaws being able to be driven in the cycle of the machine when operating in production mode from a position of maximum distance to a position of maximum closeness, capable of ensuring closure by crimping at least one staple placed between the press head and the press die, and once again to the position of maximum distance; and the staple supply mechanism is attached to one of the first or second jaws of the stapler mechanism.

The staple supply mechanism comprises at least one mobile gear element configured and able to be driven to engage with a corresponding train of staples and to ensure, by entrainment, a step of the train of staples in a feed direction that places a staple of the train of staples between the press head and the press die to be crimped.

In the aforementioned embodiment, the machine is equipped with a programmable control unit that is programmed to drive the mobile gear element of the staple supply mechanism a) by following a variable drive speed throughout the same cycle of the machine when operating in production mode, and/or b) by following a drive mode or pattern that differs between different operations in production mode, and/or c) by entraining a train of staples in a feed direction (D) during the times that elapse between two consecutive cycles of the machine when operating in production mode, and/or d) when no operation in production mode with cycles is executed by the machine.

The invention therefore envisages a machine set up to move said mobile gear element according to any of a), b), c) or d); or according to several of a), b), c) or d), including a), b) c) and d).

A drive of the staple supply mechanism independently of the gripper, separator and stapler mechanisms so that its drive overlaps with the drive of the latter mechanisms to a greater or lesser extent does not contribute to increasing the speed of known machines, since this mechanism is only asked to ensure the placement of a new staple between the press head and the press die in each cycle of the machine when operating in production mode and this requires less time than the time that elapses between the instant after crimping a staple and the instant before crimping a new staple. In other words, the time required to supply a new staple is not the bottleneck of a cycle of the machine when operating in production mode.

Accordingly, the reduced cycle time that is achieved by overlapping the times during which the stapler, gripper and separator mechanisms are driven cannot be improved by increasing the speed of drive of the staple supply mechanism.

Contrary to what was expected and going against the tide, the present invention envisages the drive of the staple supply mechanism independently of the gripper, separator and stapler mechanisms.

Detaching the staple supply mechanism from other mechanisms allows it, for example, to be driven more slowly when the mobile gear element engages and causes a train of staples to move forward.

This prevents stress on the train of staples and helps to protect it from moving forward too quickly.

In fact, increasing the rhythm of the stapler mechanism by making the staple supply mechanism simply follow it in the mode, increasing the speed that is imparted to the mobile gear element of the supply mechanism can cause it, under certain circumstances, to entrain the train of staples in a manner that is undesirable or too sudden. This may cause a slight imbalance in its forward movement and poor placement of a new staple between the jaws of the stapler mechanism and, in turn, an incident that requires production to be stopped temporarily.

Contrary to what was expected and going against the tide, the present invention also envisages the drive of the mobile gear element of the supply mechanism independently of the gripper, separator and stapler mechanisms in order to be able to choose the time and position adopted by the gear element when it engages during a cycle of the machine when operating in production mode with the train of staples, specifically and for example, to arrange it optimally so that when the jaws of the stapler mechanism adopt their position of maximum closeness, crimping a staple, it prevents a reverse movement of the train of staples that is usually applied in a direction opposite to that of its forward movement.

With this, the machine can be set up so that this optimal position varies depending on the nature of the staples from the train of staples, for example, depending on the height of the staples, as explained later.

Controlling the relative position adopted by the mobile gear element in the situation described in the previous paragraphs, which prevents a reverse movement of the train of staples, makes it possible to compensate for involuntary displacements of the mobile gear element due to, for example, the transmission means that are used for its drive, as also explained later.

Therefore, a variant of interest of the invention is that when the mobile gear element is connected to a crank in an articulated manner and guided by insertion of a fulcrum into a straight slider, in each full turn of the crank in the same direction of rotation, a back-and-forth movement is transmitted to the distal end of the mobile gear element intended to engage with a train of staples, imparting a path with an active section, where upon engaging with the train of staples it entrains said train of staples, ensuring a step of the train of staples, and a return section, empty and without engaging with the train of staples, that can stop the crank in an angular locking position such that the distal end of the mobile gear element engages with the train of staples, being a final position of the return section and a start position of the active section, and where the aforementioned angular locking position is a parameter based on the specific operation in production mode that is executed.

For example, the control unit can be configured so that the operator provides the control unit with the value of the angular locking position based on an experience table.

For example, the control unit can include several programmes that execute different operations in production mode with predetermined values for the angular locking position, with an operator being able to select the programme to be executed.

All this to be able to choose the optimal value of the angular locking position depending on the nature of the staples from the train of staples.

Contrary to what was expected and going against the tide, the present invention also envisages the drive of the mobile gear element of the supply mechanism independently of the gripper, separator and stapler mechanisms in order to be driven between consecutive cycles of the machine when operating in production mode. This makes it possible to start supplying a new staple or finish supplying a new staple even when material is being filled and while the gripper and separator mechanisms are static or unable to interact with the product being made. This helps to prevent stress on the train of staples and protect it from moving forward too quickly.

Therefore, a variant of interest of the invention is that in which the control unit is specifically programmed to continue driving the mobile gear element to ensure completing a step of the train of staples during the times that elapse between two consecutive cycles of the machine when operating in production mode.

Contrary to what was expected and going against the tide, the present invention also envisages the drive of the mobile gear element of the supply mechanism independently of the gripper, separator and stapler mechanisms in order to be driven even when the machine does not operate in production mode. This makes it possible to carry out loading, unloading or pairing manoeuvres of trains of staples, for example, without also driving the jaws of the stapler mechanism and/or the gripper and separator mechanisms, facilitating these operations, protecting the operator and/or taking advantage of more staples from a train of staples than usual, all of this as will be explained in more detail later.

Therefore, a variant of interest of the invention is that in which the programmable control unit is programmed to drive the mobile gear element of the staple supply mechanism in an operation of the machine in load mode A1 to engage with a train of staples and to ensure, by entrainment, completing more than one consecutive step of the train of staples in the feed direction without the first and second jaws of the stapler mechanism adopting the position of maximum closeness in the meantime.

Therefore, another variant of interest of the invention is that in which the programmable control unit is programmed to drive the mobile gear element of the staple supply mechanism in an operation of the machine in pairing mode A3 to engage with a train of staples and to ensure, by entrainment, completing more than one consecutive step of the train of staples in a direction opposite to the feed direction without the first and second jaws of the stapler mechanism adopting the position of maximum closeness in the meantime.

In one embodiment, the machine is equipped with at least one first driveline and one second driveline that can be controlled by the control unit, of which the first driveline ensures the drive of the first and second jaws of the stapler mechanism, and the second driveline ensure the drive of the mobile gear element of the staple supply mechanism.

The first and second drivelines may comprise, for example, respective servomotors of the known type that incorporate an adjustment system that can be controlled in both speed and position. The control of these servomotors will be used to electronically coordinate the mechanisms actuated by them.

In another embodiment, the machine is equipped with a shared driveline to which the stapler mechanism and the staple supply mechanism are coupled by a powerchain to ensure the coordinated drive of the first and second jaws and the mobile gear element of the staple supply mechanism; the powerchain including clutch means that allow the stapler mechanism to be mechanically detached from the shared driveline, and breaking the powerchain, leaving the stapler mechanism static and the shared driveline being able to continue driving the mobile gear element of the staple supply mechanism during machine operation in at least one of the production, loading, unloading or pairing modes, where the shared driveline and the clutch means are electronically controlled by the control unit.

The shared driveline may comprise, for example, a servomotor of the known type that incorporates an adjustment system that can be controlled both in speed and position.

In a variant of the invention, the machine has detection means to know whether a train of staples extends through one or more associated detection windows and the control unit is programmed to operate the machine in at least a production mode or a loading mode or an unloading mode based on a signal generated by the detection means when it is known whether the train of staples extends through the detection window(s).

In one form of implementation, a detection window associated with first detection means covers one of the press head or the press die; and the control unit is programmed so that the drive of the mobile gear element is stopped when it is known that the train of staples extends through the detection window when the machine is operating in loading mode.

In the embodiment in which the mobile gear element is connected to a crank in an articulated manner, the stop can be carried out at the end of the active section or at the end of the return section (start of the active section).

In one form of implementation, a detection window associated with first detection means covers one of the press head or the press die; and the control unit is programmed so that the drive of the mobile gear element is stopped when it is known that the train of staples does not extend through the detection window when the machine is operating in production mode. Advantageously, this allows the machine to automatically stop when an incident occurs in the normal forward direction of the train of staples.

In a variant of the machine with two mobile gear elements, each one associated with a train of staples, where n is the number of consecutive steps that a train of staples completes in the feed direction during operation in loading mode given the drive of the gear elements, the control unit is programmed to first operate the machine in a pairing mode that comprises driving the gear elements to ensure n consecutive steps of a train of staples in the opposite direction.

The number of steps n is known beforehand and this measure allows better use of the number of staples, as explained in greater detail later.

In a variant of the invention, the staple supply mechanism comprises a guide for at least one train of staples and it has a cover in the vicinity of the press head or the press die that projects above the mobile gear element, said cover being applied by elastic means towards the mobile gear element so that the cover helps to arrange the train of staples that runs between the cover and the mobile gear element against said mobile gear element; and the control unit is programmed to stop the mobile gear element in a position where, due to contact with the cover, the cover is lifted without exerting any thrust on the portion of the train of staples downstream of the mobile gear element in a state of removing staples from the machine when operating in unloading mode. This facilitates the removal of remaining staples from a train of staples that is downstream of the mobile gear element, without requiring its actuation.

In the embodiment in which the mobile gear element is connected to a crank in an articulated manner, the state of removal will correspond to an intermediate point on the active section of the path that is imparted to the distal end of the mobile gear element.

Preferably, the detection window associated with second detection means covers a position of the train of staples upstream of the mobile gear element; and the control unit is programmed so that the state of removing staples from the machine when operating in unloading mode is automatically adopted when it is known that the train of staples does not extend through the detection window and after driving the mechanism supply to ensure a predetermined number of m steps of the train of staples in the feed direction.

The number of steps m is known beforehand and this measure allows better use of the number of staples, as explained in greater detail later.

The article "a/an" is used herein to refer to one or more than one (i.e., at least one) of the grammatical object of the article. By way of example, "an element" means one or more elements.

Throughout the specification, the term "comprises", or variations such as "has" or "with", will be understood to imply the inclusion of a cited element, integer or step, or group of elements, integers or steps, but not the exclusion of any other element, integer or step, or group of elements, integers or steps.

BRIEF DESCRIPTION OF THE DRAWINGS

FIGS. 7a, 7b and 7c are enlarged views intended to show the mechanical interaction between the mobile gear element of the staple supply mechanism with a train of staples, where FIGS. 7a and 7b show optimal positions to prevent a reverse movement of the train of staples or start the forward movement of the train of staples according to the specific configuration of the staples and FIG. 7c shows a non-optimal position to prevent a reverse movement of the train of staples or start the forward movement of the train of staples.

DETAILED DESCRIPTION OF THE INVENTION

Figure 1:
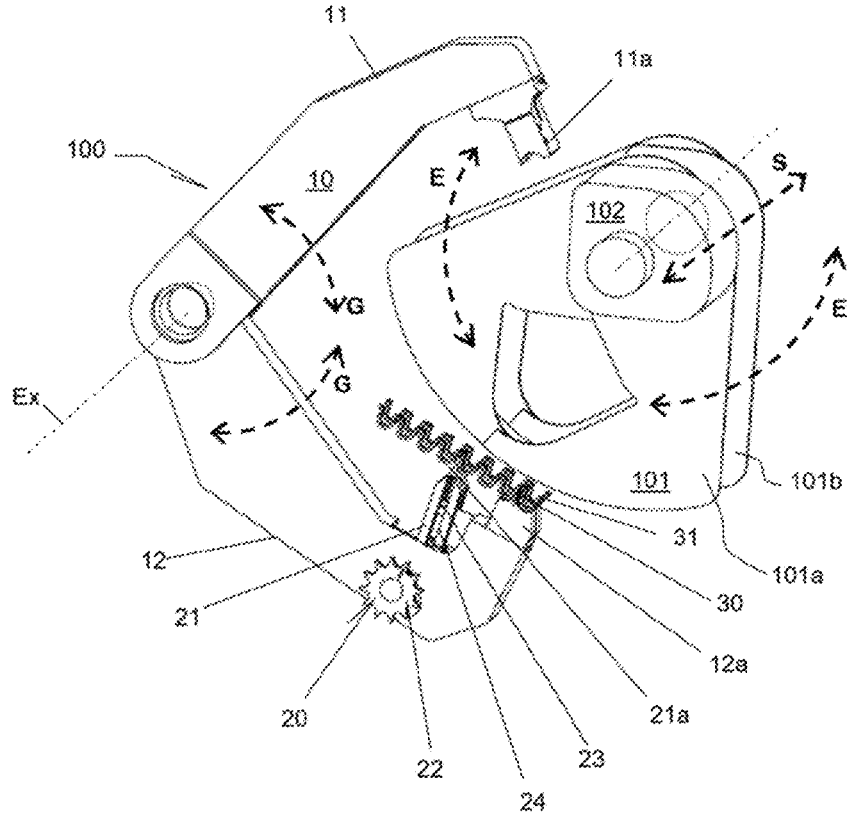
FIG. 1 schematically shows the main mechanisms of a closing machine according to the present invention.

The invention is exemplified by the machine 100 in the drawings.

The machine 100 incorporates in a known manner a gripper mechanism 101, a separator mechanism 102 and a stapler mechanism 10, illustrated schematically in FIG. 1.

The gripper mechanism 101 shown by way of example in FIG. 1 is of the type that has two pairs 101a, 101b of opposing heads, where said heads can be driven in a direction essentially transverse to the orientation of the sausage product between positions of minimum and maximum overlap, as indicated by the arrows E in FIG. 1. The heads of the same pair are configured so that in the position of maximum overlap they constrict a filled sausage product placed between them.

It is understood that the present invention is also applicable to machines with heads of the gripper mechanism that are configured differently from those shown here and/or which gripper mechanism 101 follows a drive technique different from that shown here.

The separator mechanism 102 shown by way of example in FIG. 1 is of the type set up to move each pair 101a, 101b of heads of the gripper mechanism 101 in an essentially longitudinal direction with respect to the filled sausage product, as shown by the arrows S in FIG. 1, between positions of maximum closeness and maximum distance to produce an empty sausage product portion in the sausage product, the heads of each pair 101a, 101b adopting the position of maximum overlap.

It is understood that the present invention is also applicable to machines which separator mechanism is configured or follows a drive technique different from that shown here.

The stapler mechanism 10 shown by way of example in FIG. 1 is of the type that has first and second jaws 11, 12 that can be driven between positions of maximum distance and maximum closeness as indicated by arrows G in FIG. 1. The first jaw 11 here is an upper jaw and has a press head 11a; and the second jaw 12 here is a lower jaw that has a press die 12a. In the position of maximum closeness, the stapler mechanism 10 is ensuring closure by crimping a staple placed between the press head 11a and the press die 12a around an empty product portion arranged between said staple and the press head 11a.

Conventionally, the die and the press head are dual, and the closure can be ensured by crimping two staples placed in parallel between the press head 11a and the press die 12a around the empty product portion arranged between said staple and the press head 11a. Although in this sense FIG. 1 shows two trains of staples in parallel, the following explanation is made with reference to a single train of staples to simplify the explanation.

The stapler mechanism also has a cutting device, not shown, suitable for transversely cutting the empty product portion just closed by stapling. Since the die and the press head are dual, the cutting device ensures the transverse cutting of the empty product portion at a point arranged between the two staples that have just been closed by crimping.

A machine according to the invention may have other mechanisms known in the art, such as mechanisms for placing ties, labels or other accessories, which incorporation into the machine is fully compatible with what is explained here but which are not described in greater detail since they are not related to the invention.

When operating the machine 100 in production mode, the machine repeats stapling cycles. In each cycle, the gripper 101, separator 102 and stapler 10 mechanisms of the machine 100 are driven in coordination.

In a variant of the invention, the machine is provided with separate drivelines for this purpose, said drivelines able to be driven in electronic coordination by a control unit 60 for the gripper, separator and stapler mechanisms.

In other variants of the invention, one or more of the gripper, the separator and the stapler mechanisms share a driveline.

In any case, the machine 100 is equipped in a first variant with a first driveline 19 and with a second driveline 29 that can be controlled by the control unit 60, of which the first driveline 19, whether or not it is shared with the gripper and/or separator mechanisms, ensures the drive of the first and second jaws 11, 12 of the stapler mechanism 10; and the second driveline 29 ensures the drive of the staple supply mechanism 20. This architecture is illustrated schematically in FIG. 4.

Figure 2:
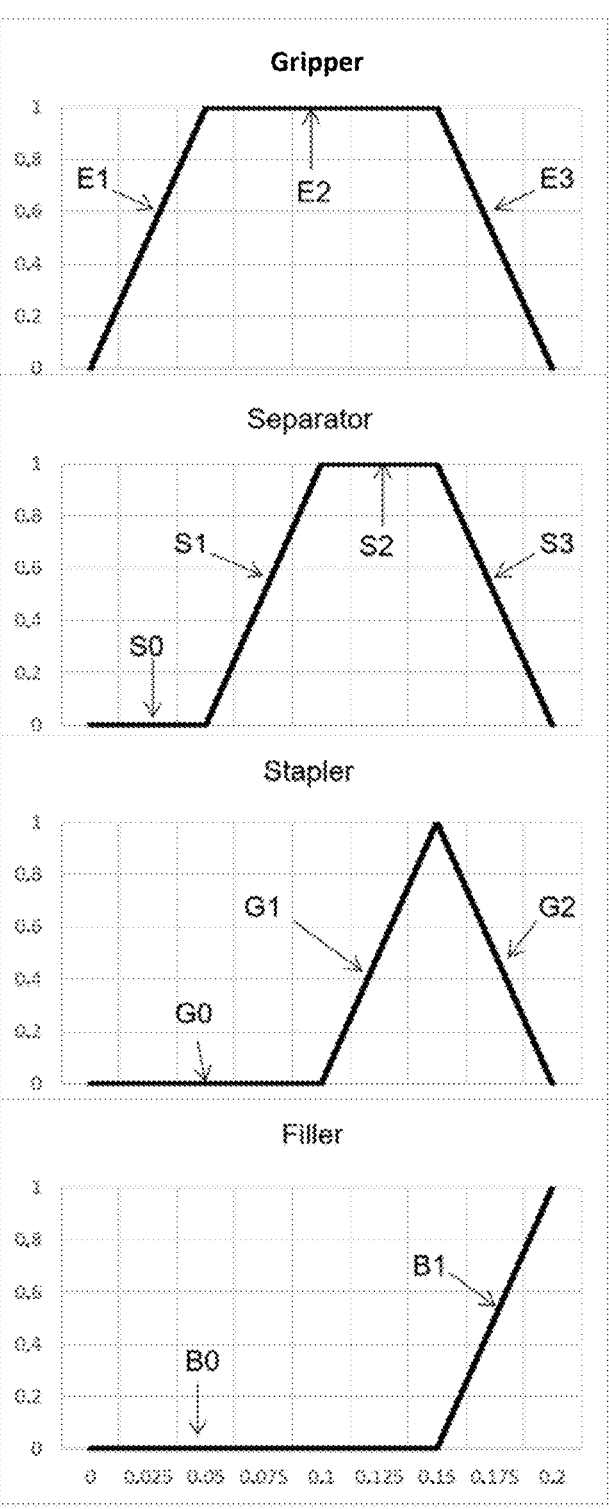
FIG. 2 is a diagram of movements of the gripper, separator and stapler mechanisms throughout a cycle of the closing machine when operating in production mode, which also includes the state of a filling equipment that does not belong to the closing machine. In the diagram, the X-axis indicates the cycle time and the Y-axis indicates the fraction of a full turn of the cycle.

A typical cycle of the machine 100 in production mode P0 may correspond to the diagram of movements in FIG. 2, which comprises:

driving in E1 the heads of each pair 101a, 101b of heads of the gripper mechanism 101 towards their relative position of maximum overlap to constrict a sausage product, while in S0 the pairs 101a, 101b of heads adopt the position of maximum closeness;

driving in S1 the separator mechanism 102 to move the pairs 101a, 101b of heads towards their relative position of maximum distance while in E2 the heads of each pair 101a, 101b adopt the position of maximum overlap, constricting the sausage product to obtain an empty sausage product portion;

driving in G1 the first and second jaws 11, 12 of the stapler mechanism 10 towards their relative position of maximum closeness to crimp a staple 31 around said empty sausage product portion, to close it and cut it transversely, while in E2 and S2 the gripper 101 and separator 102 mechanisms ensure the empty sausage product portion; and driving in E3, S3 and G2 the gripper 101, separator 102 and stapler 10 mechanisms in coordination, respectively, to return the heads of each pair 101a, 101b to their original position of minimum overlap, the pairs 101a, 101b of heads to their original position of maximum closeness and the first and second jaws 11 and 12 of the stapler mechanism 10 also to their original position of maximum distance.

Between one cycle and the one that follows it, operating the machine 100 in production mode may involve keeping the gripper, separator and stapler mechanisms on standby in the aforementioned original position while continuing to fill material in a new product, especially if it is a large sausage product.

Figure 3:
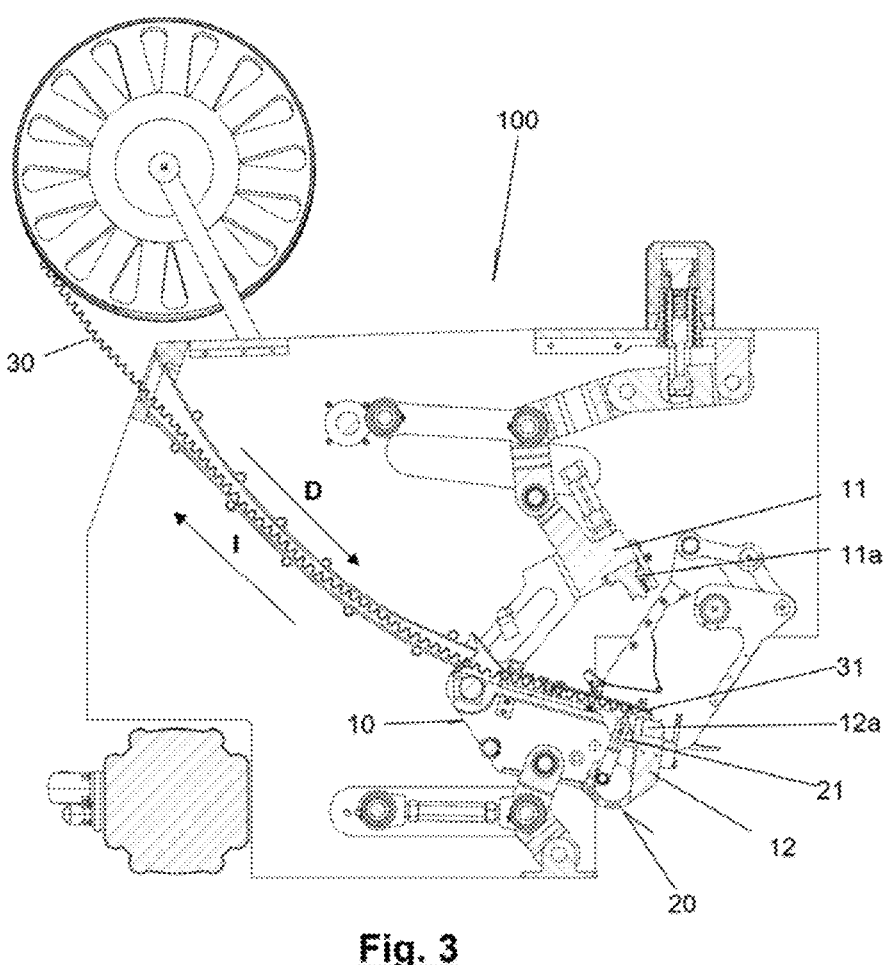
FIG. 3 is a complete view of the closing machine and a train of staples that supplies the machine, on demand, with staples.

FIG. 3 shows the machine 100, in this case showing more details of the stapler mechanism 10 and the staple supply mechanism 20 with staples from a staple magazine in the form of a reel around the core of which a train of staples 30 is wrapped.

The expression "train of staples" is used to designate a series of staples in a row, the staples being linked or connected to each other to maintain the row formation, but where the first staple 31 can be separated from the rest when it is crimped around an empty sausage product portion that is closed when the machine 100 operates in a production mode when the first and second jaws 11, 12 of the stapler mechanism 10 adopt their position of maximum closeness.

In the machine 100 shown, the staple supply mechanism 20 is attached to the second jaw 12, the lower one, of the stapler mechanism 10 and has a mobile gear element 21 configured and able to be driven in one cycle of the machine when operating in production mode to engage with the train of staples 30 and ensure a step of the train of staples 30 in the feed direction D that places a first staple 31 from the train of staples 30 between the press head 11a and the press die 12a to be crimped.

In the context of the present invention, being able to be driven in a cycle of the machine when operating in production mode does not exclude that it can also be driven when a cycle of the machine operating in a production mode is not executed. For example, it does not exclude that the mobile gear element 21 is driven in a period between two consecutive cycles of the machine 100 operating in production mode or when the machine 100 executes other types of operations, such as loading, unloading or pairing operations that are explained later.

In the example shown, the staple supply mechanism 20 (see FIG. 1 for more details) is of the type comprising a slider-crank mechanism (inversion 3; or inverted slider-crank mechanism third inversion), in which crank 22 it is connected in an articulated manner and said mobile gear element 21 performs the function of a connecting rod, which movement is guided by insertion, into a straight slider 24 provided for this purpose on the same mobile gear element 21, of a fixed fulcrum 23. In each full turn of the crank 22 in the same direction of rotation, a back-and-forth movement of the distal end 21a of the mobile gear element 21 is transmitted following a path with a forward active section that engages with and mechanically entrains the train of staples 30 and with a backward return section that places it outside the reach of the train of staples.

Taking the drawings as a reference, the rotation of the crank 22 in an anticlockwise direction transmits a movement to the mobile gear element 21 capable of engaging and entraining a train of staples in the forward direction D in the active section of its path; and the rotation of the crank 22 in a clockwise direction transmits a movement to the mobile gear element 21 capable of engaging and entraining a train of staples in the reverse direction I in the active section of its path, which will be used to operate the machine in a pairing mode as will be explained later.

Figure 7C:
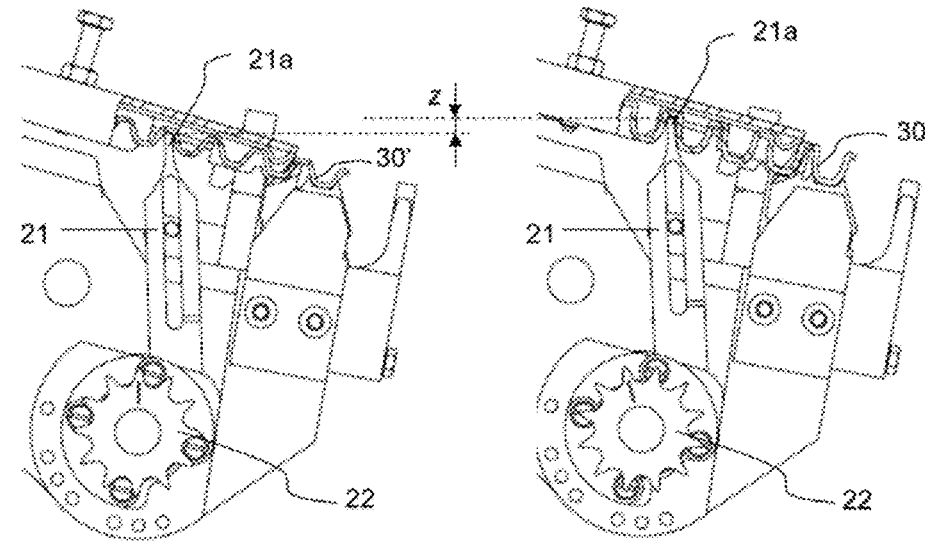

The crank 22 can be driven in rotation by direct coupling or indirectly with a driven shaft, for example, the output shaft of a motor group. In the case shown, the rotation movement is transmitted to the crank 22 by means of a chain, belt or similar 25 (visible in FIG. 7c) from a driven wheel 27 with the particularity that said driven wheel 27 is rotatably mounted around an axis Ex that coincides with the axis around which the first and second jaws 11, 12 of the stapler mechanism 10 are also articulated to move them between their relative positions of maximum distance and maximum closeness.

Although the supply mechanism 20 has been exemplified as implemented with this particular slider-crank mechanism (with third inversion), the invention is also applicable to machines which drive technique for moving the mobile gear element 21 of the staple supply mechanism 20 is different from that shown here, as long as it is capable of transmitting to an equivalent of the distal end 21$a$ of the mobile gear element 21$a$ movement in the forward direction D or reverse direction I of the train of staples 30, engaging with said train of staples for this purpose, and a reverse movement in the opposite direction to that selected, without engaging with the train of staples 30.

The exemplary machine 100 is equipped with detection means 35 (see FIGS. 7$c$ and 8) to determine whether a train of staples 30 extends through a detection window that covers the press die 12$a$.

The exemplary machine 100 is also equipped with a programmable control unit 60 programmed to operate the machine 100 in at least one of the following modes, preferably in several of the following modes, and more preferably in all of the following modes.

Mode i)

It comprises executing several cycles of the machine when operating in production mode by running a program that not only drives the gripper 101, separator 102 and stapler 10 mechanisms in each cycle in a way that is similar to the cycle in production mode P0 in FIG. 2, but in this case it also drives the staple supply mechanism 20, rotating the crank 22 in a characteristic manner.

Figure 4:
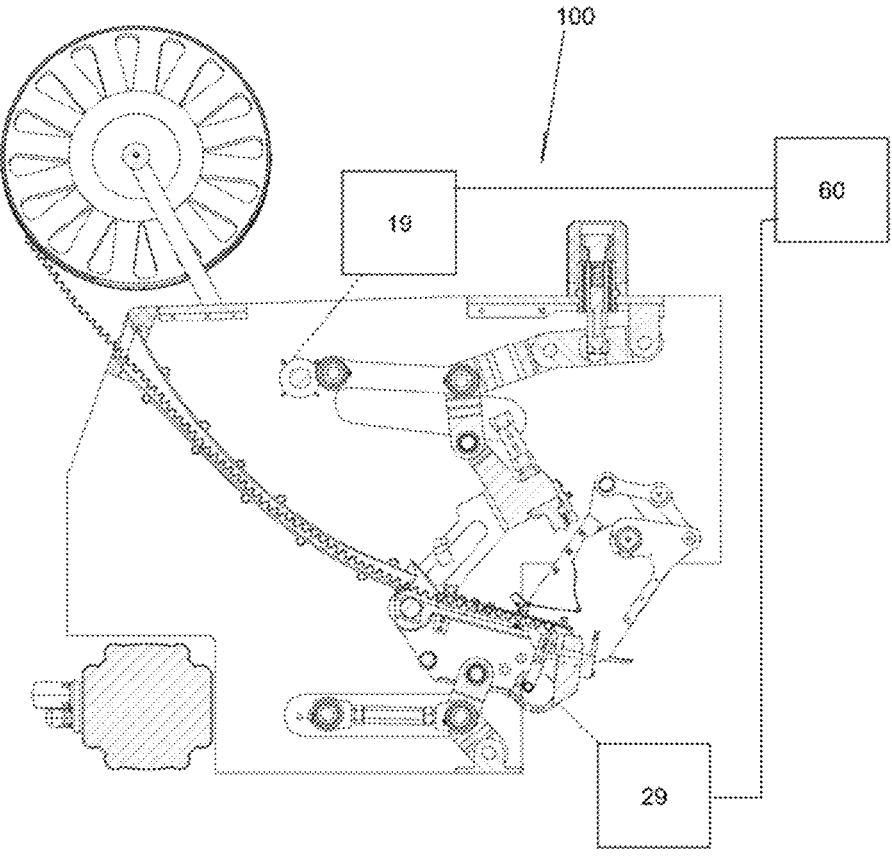
FIG. 4 shows the machine of FIG. 3, schematically identifying other components not represented or visible, such as the drivelines, the control unit and their relationships according to a variant of the invention.

A cycle of operation in production mode P1 may correspond, in a variant, to the diagram of movements of FIG. 4, where it should be noted that the supply mechanism 20, the crank 22 in practice, is driven following a non-constant drive curve or mode throughout the cycle, highlighting, for example, in C1 an adjustment to arrange the mobile gear element 21 in the optimal position to prevent the reverse movement of the train of staples 30 when a first staple 31 is crimped and separated from the train of staples 30.

This adjustment in C1 when operating in production mode P1 is especially suitable for machines 100 like the one shown, in which the rotation movement is transmitted to the crank 22 by means of a belt or similar 25 (shown in FIG. 7$c$) from a driven wheel 27 rotatably mounted around the axis Ex around which the second jaw 12, the lower one, to which the supply mechanism 20 is attached, is also articulated. This transmission solution causes the rotation of the second jaw 12 in G1 during the period 0.1-0.15 to produce a slight clockwise rotation of the crank 22, which the programme offsets by suitably driving the staple supply mechanism 20 to leave the mobile gear element 21 in the optimal position, the angular locking position, in order to prevent the reverse movement of the train of staples 30. Suitably driving may include controlling the motor group 29 to rotate the crank 22 anticlockwise and place it in an angular position exceeding the angular locking position that is offset when rotating the crank 22 clockwise due to the effect of the tension transmitted by the belt or similar 25 upon rotating the second jaw 12 in G1.

This adjustment in C1 also contributes to subsequently producing better entrainment, as it is more efficient, without including empty sections of forward movement, without entrainment, of the train of staples 30.

Figure 7C:
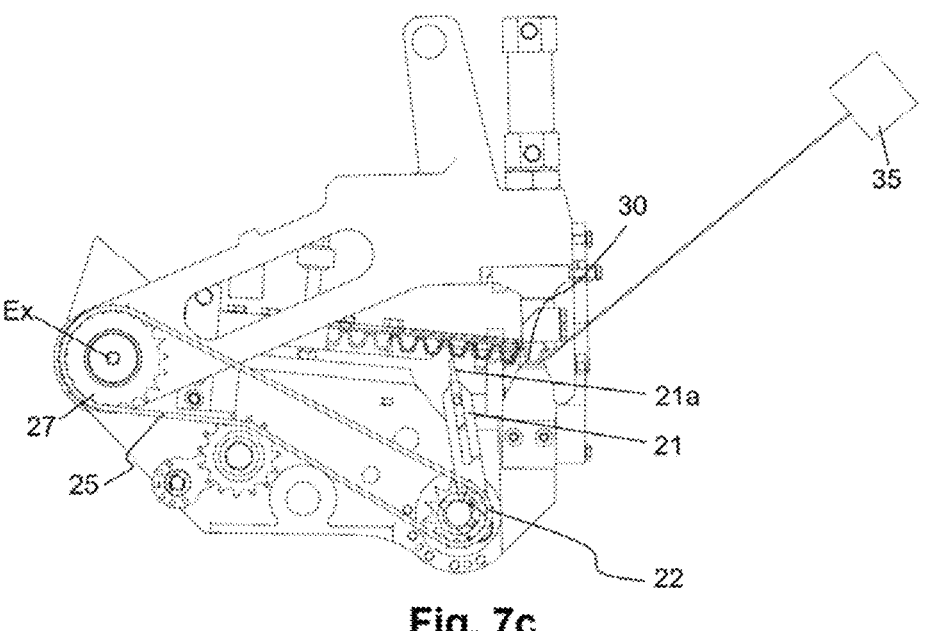

FIGS. 7$b$ and 7$c$ show, respectively, optimal and non-optimal angular positions of the crank 22 to prevent the reverse movement of the train of staples. In the first case, the distal end 21$a$ of the mobile gear element 21 engages with the train of staples 30, being able to prevent its reverse movement. In the second case, the distal end 21$a$ of the mobile gear element 21 does not engage with the train of staples 30, being unable to prevent its reverse movement.

Mode ii)

It comprises executing several cycles of the machine when operating in production mode by running a program that not only drives the gripper 101, separator 102 and stapler 10 mechanisms in each cycle in a way that is similar to the cycle in production mode P0 in FIG. 2, but in this case it also drives the staple supply mechanism 20, rotating the crank 22 in the period between consecutive cycles in production mode.

Figure 6:
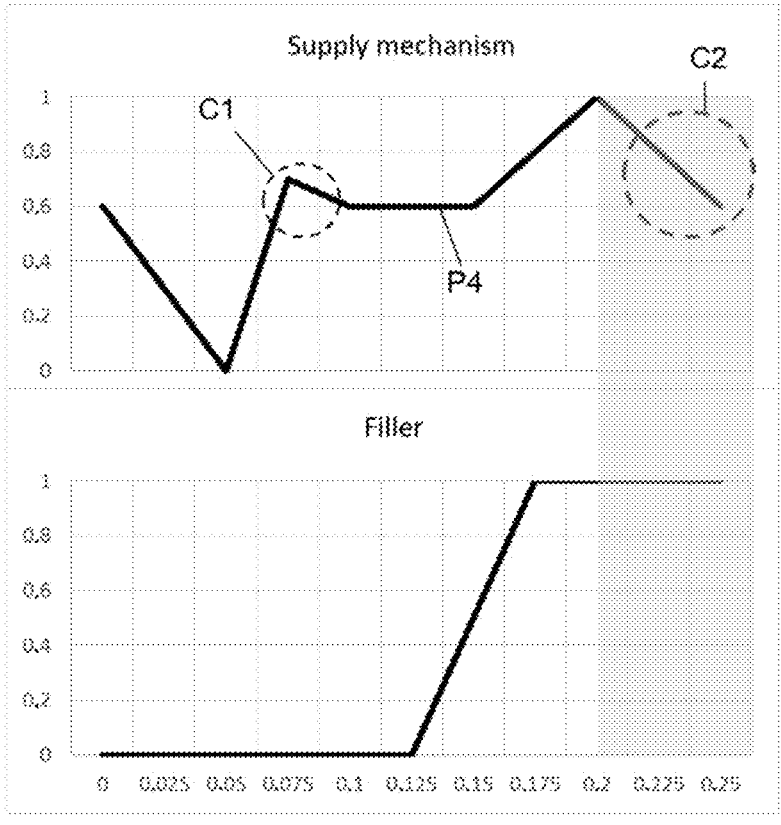
FIG. 6 is another diagram of movements of the staple supply mechanism throughout a cycle of the closing machine when otherwise operating in production mode P4, which also includes the state of a filling equipment that does not belong to the closing machine. In the diagram, the X-axis indicates the execution time and the Y-axis indicates the fraction of a full turn of the cycle.

An operation of this type may correspond, in a variant, to the diagram of movements of FIG. 6 which resembles the production mode P1. However, the operation in production mode P4 shown in FIG. 6 is suitable for producing larger filled sausage products and/or sausage products that require a longer filling time during one part of which a conventional closing machine remains on standby, without executing a production cycle, with the gripper 101, separator 102 and stapler 10 mechanisms with its associated staple supply mechanism, on standby.

When operating in production mode P4, the drive of the staple supply mechanism 20 is detached from the gripper 101 and separator 102 mechanisms and also from the staple mechanism 10, using a filling time in C2, between consecutive production cycles, to continue entraining the train of staples. This time between consecutive cycles is indicated on a grey background in the diagram of movements in FIG. 6.

This drive of the supply mechanism 20 between production mode cycles contributes to better entrainment, as it is slower and puts less stress on the train of staples 30.

Mode iii)

Figure 5:
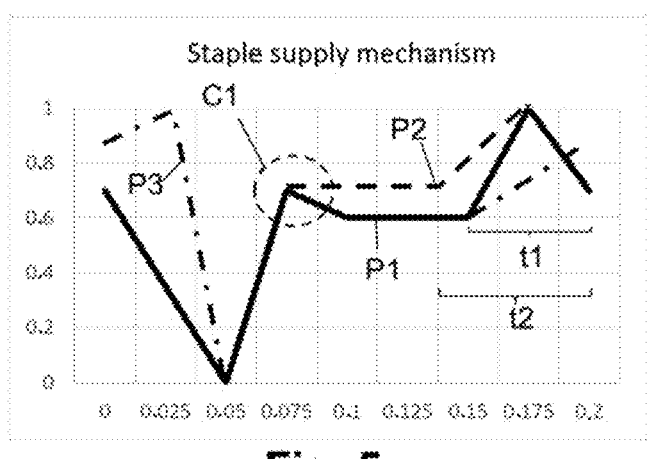
FIG. 5 is a diagram of movements of the staple supply mechanism throughout a cycle of the closing machine when operating in production mode P1, P2 and P3. In the diagram, the X-axis indicates the cycle time and the Y-axis indicates the fraction of a full turn of the cycle.

Another operation in production mode P2 may correspond to the diagram of movements superimposed in dashed lines in FIG. 5, in this case lacking adjustment C1 as it corresponds to a machine variant in which the crank 22 is directly driven and therefore there is no need to offset tensions that a belt transmission means or similar may exert on the crank 22.

The operation in production mode P2 illustrates the capacity of a machine like the one of the invention to optimise the forward movement of a train of staples depending on the nature of the staples. This is reflected in the different position at one turn of the cycle in which the supply mechanism stops in the production modes P1 and P2 shown together in FIG. 5, at 0.6 and 0.7 turns, respectively, of the drive cycle of the supply mechanism 20.

To illustrate this capacity and how it translates into the angular locking position of the mobile gear element 21, and therefore that of its distal end 21$a$, FIGS. 7$a$ and 7$b$ show the optimal angular locking position of the crank 22 to prevent the reverse movement of the respective trains of staples 30' and 30, where the staples form the train of staples 30 in FIG. 7$b$ are taller. In these examples, the optimal angular locking position of the crank 22 varies by about 15°, which represents a difference z in height of the position of the distal end 21$a$ of the gear element.

Mode iii) envisaged by the invention is that in which the machine is programmed to run different drive programs for the staple supply mechanism 20 depending on the nature of the staples from the train of staples, where even the drive of the rest of the gripper, separator and stapler mechanisms remain unchanged (that is, are the same). Alternatively, it is envisaged that the operator can enter the preferred angular locking position as an operating parameter, based on a table of experiences or based on predetermined values that the machine can offer to the operator for selection based on the nature of staples from the train of staples.

The diagram of movements in FIG. 5 also illustrates another effect that is obtained by being able to arrange the mobile gear element 21 in the optimal position with respect to the train of staples 30 to prevent its reverse movement. Specifically, in production mode P2, arranging the crank 22 in an angular locking position that represents a more forward position of one turn of the cycle with respect to, for example, the position in the production mode P1 means that there is more time to rotate the crank 22 in the direction that ensures the forward movement of the train of staples and thus puts less stress on the train of staples. This circumstance can be identified in FIG. 5 by comparing the time window t1, during which the staple supply mechanism is driven so that it produces the forward movement of the train of staples in the production mode P1, and the time window t2, where t2>t1, during which the staple supply mechanism is driven so that it produces the forward movement of the train of staples in the production mode P2.

The same diagram of movements in FIG. 5 also illustrates other possible production modes, such as the production mode P3 that comprises continuing to rotate the crank 22 and moving the mobile gear element 21 to ensure a step of the train of staples coinciding with E1, in other words, having started a new cycle with the drive of the heads of the gripper mechanism.

This drive of the supply mechanism 20 that is customised or depends on the nature of the staples contributes to better entrainment, as it is more efficient and sometimes slower, without putting as much as stress on the train of staples 30.
Mode iv)

It comprises operating the machine in a loading mode by running a program that drives the supply mechanism 20 and ensures more than one consecutive step of the train of staples in the feed direction D without the first and second jaws 11, 12 of the stapler mechanism 10 adopting the position of maximum closeness in the meantime.

Figures 8, 9:
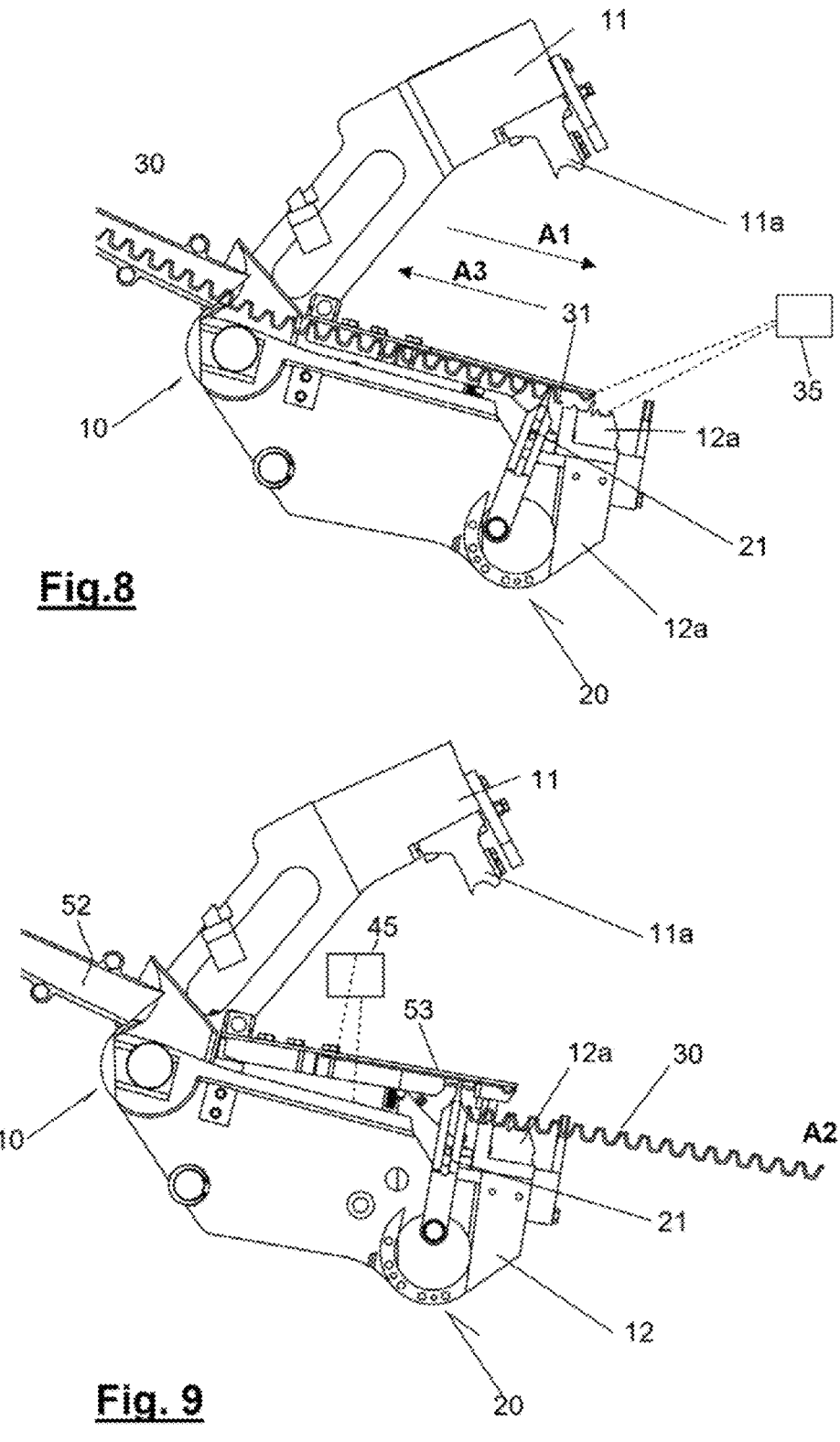
FIG. 8 is an enlarged view of the stapler mechanism and the staple supply mechanism, at a time that may correspond to an operation of a machine according to the invention in a loading mode.
FIG. 9 is an enlarged view of the stapler mechanism and the staple supply mechanism, at a time that may correspond to an operation of a machine according to the invention in an unloading mode, specifically with the machine adopting the state of staple removal.

A variant A1 of the loading mode may comprise driving the stapler mechanism 20, producing several full turns of the crank 22, keeping the first and second jaws 11, 12 of the stapler mechanism 20 static in their position of maximum distance, as shown in FIG. 8. It is envisaged that the gripper 101 and separator 102 mechanisms are also not driven, preferably with the latter adopting the position of maximum distance from the pairs 101a, 101b of heads.

In order to improve the loading mode, the exemplary machine 100 makes use of the detection means 35 to know whether a train of staples 30 extends through an associated detection window and the control unit 60 is programmed to operate the machine in the loading mode A1 based on a signal generated by the detection means 35 when it is known that the train of staples 30 extends through the detection window.

The detection window may cover the press die 12a and the program may be instructed to automatically stop the loading mode A1 when a staple is detected immediately above said press die 12a.

This drive of the supply mechanism 20 offers greater safety to the operator and facilitates the replacement operations of a staple magazine.
Mode v)

It comprises operating the machine in an unloading mode A2 by running a program that comprises stopping the supply mechanism 20 by placing the mobile gear element 21 in a lifted position, that is, in the middle of its active section, as shown in FIG. 9, the first and second jaws 11 and 12 of the stapler mechanism 20 adopting a position other than that of their maximum closeness, preferably their position of maximum distance, the assembly adopting a state of staple removal.

Conventionally, the supply mechanism 20 of the exemplified machine 100 comprises a guide 52 for the train of staples 30 and it has a cover 53 in the vicinity of the press die 12a that projects above the mobile gear element 21, said cover 53 being applied by elastic means towards the mobile gear element 21 so that the cover 53 helps to arrange the train of staples 30 that runs between the cover 53 and the mobile gear element 21 against said gear element.

The arrangement of the mobile gear element 21 in a position where, due to contact with the cover 53, it is lifted without exerting any thrust on the portion of the train of staples 30 downstream of the mobile gear element 21 in the state of staple removal, as shown in FIG. 9, makes it possible to easily remove the remaining staples from the train of staples that cannot be used.

In order to improve the unloading mode, the exemplary machine 100 is equipped with other detection means 45 to know whether a train of staples 30 extends through an associated detection window that covers a position of the train of staples upstream of the mobile gear element 21; and the control unit 60 is programmed to automatically operate the machine in an unloading mode A2 based on a signal generated by the detection means 45 when it is known that the train of staples 30 does not extend through the detection window and after driving the staple supply mechanism 20, producing a predetermined number m of forward steps of the train of staples 30 either in production mode, that is by driving the gripper, separator and stapler mechanisms in coordination, or as part of the unloading mode without driving the gripper, separator and stapler mechanisms, the first and second jaws 11 and 12 of the stapler mechanism 20 preferably adopting their position of maximum distance.

The number m of steps will be a function of the number of staples in a train of staples 30 between the detection window of the detection means 45 and the mobile gear element 21.

This drive of the supply mechanism 20 offers greater safety to the operator and facilitates the replacement operations of a staple magazine.
Mode vi)

It comprises operating the machine in a pairing mode A3 by running a program that drives the supply mechanism 20 and ensures more than one consecutive step of the train of staples 30 in the direction I opposite to the feed direction D without the first and second jaws 11, 12 of the stapler mechanism 10 adopting the position of maximum closeness in the meantime.

The pairing mode is of interest when the machine is a duplex machine equipped with two gear elements moved in unison, for example, by the same crank, each intended to engage with a different train of staples usually guided in parallel and coming from different magazines. This type of machine ensures the application of two staples to produce two closures of the empty portion which will be cut transversely at one point between the closures to separate a finished sausage product from the next sausage product that will be finished in the following cycle of the machine in production mode.

It may happen that a train of staples runs out before another train of staples.

A pairing mode A3 can be executed on an undepleted train of staples to ensure n steps of the undepleted train of staples in the direction I and immediately before executing the loading mode A1, which will ensure the same number of n consecutive steps of both trains of staples in the feed direction D until a first staple from the new train of staples is placed on the press die 12a, at the same time as the first staple from the undepleted train of staples is placed on the press die 12a.

The number n of steps will be a function of the number of staples in a train of staples 30 between the mobile gear element 21 and the closing die 12a.

This drive of the supply mechanism 20 offers greater safety to the operator and allows better use of the staples from a train of staples.

The invention claimed is:

1. A closing machine for closing sausage products, comprising:
   a gripper mechanism;
   a separator mechanism;
   a stapler mechanism, wherein at least the stapler mechanism is configured to be driven independently but in coordination with the gripper mechanism and the separator mechanism during a cycle of the machine when operating the machine in a production mode in which the gripper mechanism, the separator mechanism, and the stapler mechanisms each adopt a first position at a beginning and at an end of said cycle; and
   a staple supply mechanism for supplying staples to the stapler mechanism, wherein the staple supply mechanism is configured to be driven independently of the gripper mechanism, the separator mechanism and the stapler mechanisms.

2. The machine according to claim 1, wherein:
   the stapler mechanism comprises a first jaw that has a press head and a second jaw that has a press die, the first and second jaws being able to be driven in the cycle of the machine operating in the production mode from a position of maximum distance to a position of maximum closeness and back to the position of maximum distance,
   wherein in the position of maximum closeness, the stapler mechanism is capable of ensuring closure by crimping at least one staple placed between the press head and the press die,
   wherein the staple supply mechanism, is attached to one of the first or second jaw of the stapler mechanism, and wherein the staple supply mechanism has at least one mobile gear element configured to be driven to engage with a corresponding train of staples and to ensure, by entrainment, a step of the train of staples in a feed direction (D) that places a staple of the train of staples between the press head and the press die to be crimped, and
   wherein the machine is equipped with a programmable control unit that is programmed to drive the at least one mobile gear element of the staple supply mechanism in one or more of the following ways:
   a) following a variable drive speed throughout the cycle of the machine when operating in the production mode,
   b) following a drive mode or pattern that differs between that of the production mode and that of a different production mode,
   c) entraining a train of staples in a feed direction (D) during a time that elapses between two consecutive cycles of the machine when operating in the production mode, or d) entraining the train of staples when no operation in the production mode is executed by the machine.

3. The machine according to claim 2, wherein the control unit is programmed to drive the mobile gear element according to a), wherein:
   the mobile gear element is connected to a crank in an articulated manner and its movement is guided by insertion of a fulcrum into a straight slider, so that in each full turn of the crank in a first direction of rotation, a back-and-forth movement is transmitted to a distal end of the mobile gear element intended to engage with a train of staples, imparting a path with an active section, which upon engaging with the train of staples, the mobile gear element entrains said train of staples, ensuring a step of the train of staples, and a return section, empty and without engaging with the train of staples,
   the variable drive speed comprises stopping the crank in an angular locking position such that the distal end of the mobile gear element engages with the train of staples, and which is a final position of a return section and a start position of the active section, and
   the angular locking position is a parameter based on the production mode.

4. The machine according to claim 3, wherein a value of the angular locking position is configured to be provided to the control unit and associated with the production mode, and in addition or alternatively the control unit includes several programmes that execute different production modes with predetermined values for the angular locking position, with an operator being able to select the programme to be executed.

5. The machine according to claim 2, wherein the control unit is programmed to drive the mobile gear element according to b), wherein different production modes are configured to be selected by an operator of the machine and in that each production mode differently orders the mobile gear element to be driven during associated production modes cycles.

6. The machine according to claim 2, wherein the control unit is programmed to drive the mobile gear element according to c), wherein the control unit is specifically programmed to continue driving the mobile gear element to ensure completing a step of the train of staples during the time that elapses between two consecutive cycles of the machine when operating in the production mode.

7. The machine according to claim 2, wherein the control unit is programmed to drive the mobile gear element according to d), wherein the control unit comprises, when operating in a loading mode (A1), ordering the mobile gear element to be driven to engage with a train of staples and to ensure, by entrainment, completing more than one consecutive step of the train of staples in the feed direction (D) without the first and second jaws of the stapler mechanism adopting the position of maximum closeness in the meantime.

8. The machine according to claim 2, wherein the control unit is programmed to drive the mobile gear element according to d), wherein the control unit comprises, when operating in a pairing mode (A3), ordering the mobile gear element to be driven to engage with a train of staples and to ensure, by entrainment, completing more than one consecutive step of the train of staples in a direction (I) opposite to the feed direction (D) without the first and second jaws of the stapler mechanism adopting the position of maximum closeness in the meantime.

9. The machine according to claim 2, further comprising at least one first driveline and one second driveline configured to be controlled electronically by the control unit, of which the first driveline is configured to drive the first and the second jaws of the stapler mechanism and the second driveline is configured to drive the mobile gear element of the staple supply mechanism.

10. The machine according to claim 2, further comprising a shared driveline to which the stapler mechanism and the staple supply mechanism are coupled by a powerchain to ensure a coordinated drive of the first and second jaws and the mobile gear element; the powerchain including clutch means that allow the stapler mechanism to be mechanically detached from the shared driveline, and breaking the powerchain, leaving the stapler mechanism static and the shared driveline being able to continue driving the mobile gear element of the staple supply mechanism during machine operation in the production mode, loading (A1), unloading (A2) or pairing (A3) modes, where the shared driveline and the clutch means are electronically controlled by the control unit.

11. A machine according to claim 2, further comprising a detection means to know whether a train of staples extends through one or more associated detection windows and in that the control unit is programmed to operate the machine in at least a loading mode (A1) or an unloading mode, which comprises ordering the mobile gear element to be driven to engage with a train of staples and to ensure completing more than one consecutive step of the train of staples in the feed direction (D) without the first and second jaws of the stapler mechanism adopting the position of maximum closeness in the meantime, based on a signal generated by the detection means when it is known whether the train of staples extends through a detection window.

12. The machine according to claim 11, wherein a detection window is associated with first detection means and covers one of the press head or the press die; and in that the control unit is programmed so that the drive of the mobile gear element is stopped during the operation of the machine in load mode (A1) when it is known that the train of staples extends through the detection window.

13. The machine according to claim 2, further comprising a detection means that covers one of the press head or the press die; and in that the control unit is programmed to operate the machine in at least one production mode that comprises stopping the mobile gear element if after driving the mobile gear element to ensure, by entrainment, a step of the train of staples in a feed direction (D) it is known that the train of staples does not extend through the detection window.

14. The machine according to claim 11, wherein n is the number of consecutive steps that a train of staples completes in the feed direction (D) during operation in loading mode (A1) given the drive of the mobile gear element, the control unit is programmed to first operate the machine in a pairing mode (A3) that comprises driving the mobile gear element to ensure n consecutive steps of a train of staples in the opposite direction (I).

15. The machine according to claim 2, wherein the staple supply mechanism comprises a guide for the at least one train of staples; and a cover in the vicinity of the press head or the press die that projects above the mobile gear element, said cover being applied by elastic means towards the gear element so that the cover helps to arrange the train of staples that runs between the cover and the gear element against said gear element; and in that the control unit is programmed to stop the gear element in a position where, due to contact with the cover, the cover is lifted without exerting any thrust on the portion of the train of staples downstream of the gear element in a state of removing staples from the machine when operating in a unloading mode (A2).

16. The machine according to claim 15, wherein the detection window associated with second detection means covers a position of the train of staples upstream of the mobile gear element; and in that the control unit is programmed so that the state of removing staples from the machine when operating in an unloading mode (A2) is automatically adopted when it is known that the train of staples does not extend through the detection window and after driving the supply mechanism to ensure a predetermined number of m steps of the train of staples in the feed direction (D).

17. A sausage production process that uses a machine according to claim 2, wherein the programmable control unit is programmed to drive the staple supply mechanism and move the mobile gear element when a cycle of the machine when operating in the production mode is not executed, a process comprising continuing to drive the mobile gear element of the supply mechanism to finish ensuring a step of the train of staples in the feed direction (D) that places a staple of the train of staples between the press head and the press die of the stapler mechanism during a standby time that elapses between the end of one cycle and the beginning of the following cycle of the machine when operating in the production mode, a standby time during which material is stuffed into the casing of the sausage product to be closed in said following cycle of the machine.

* * * * *